Feb. 14, 1950 V. H. WILEY 2,497,524
AUTOMATIC TUNING APPARATUS
Filed May 6, 1944
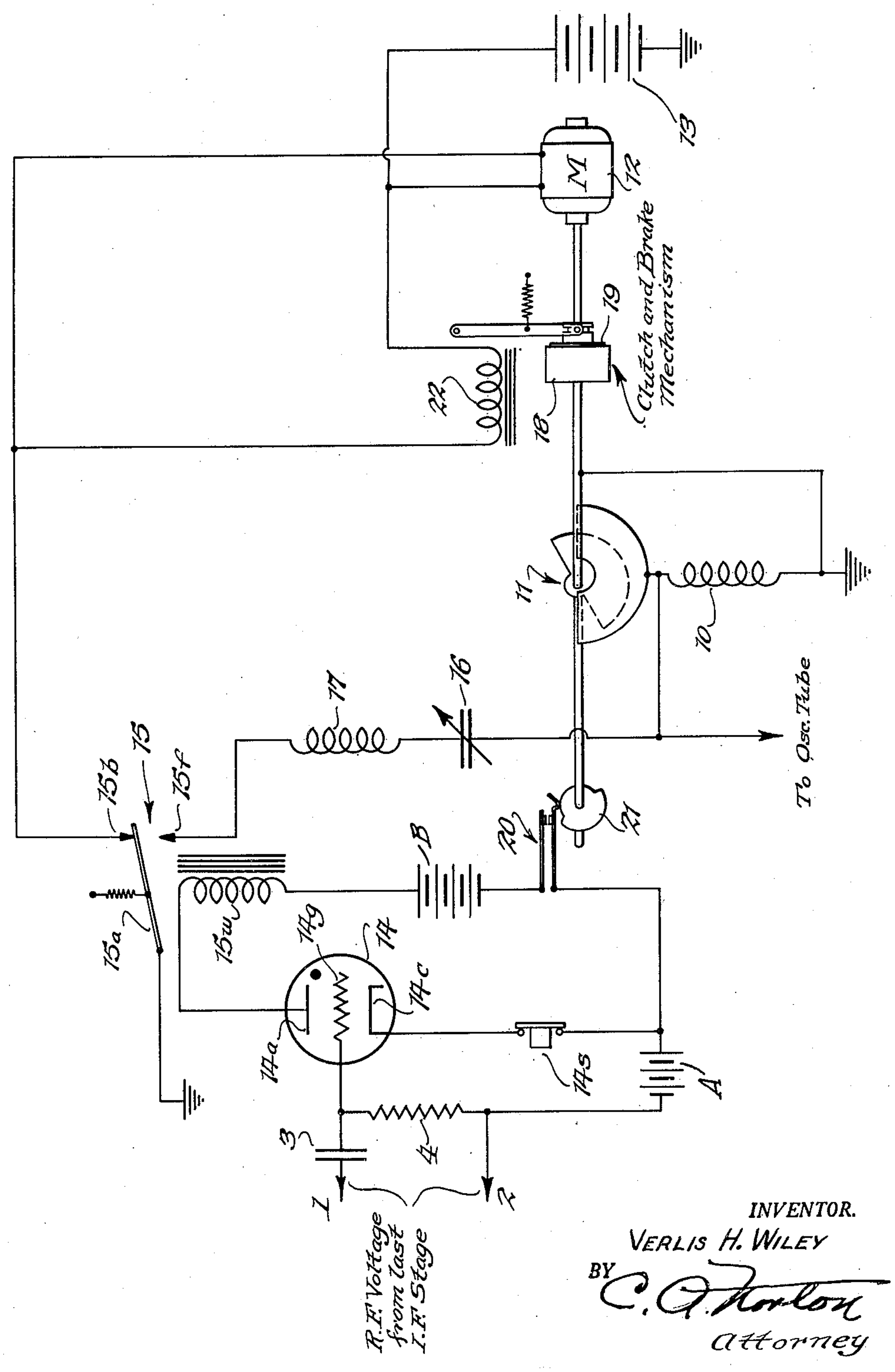
INVENTOR.
VERLIS H. WILEY
BY C. A. Norton
Attorney

UNITED STATES PATENT OFFICE 2,497,524

AUTOMATIC TUNING APPARATUS

Verlis H. Wiley, Kenmore, N. Y., assignor to Colonial Radio Corporation, Buffalo, N. Y.

Application May 6, 1944, Serial No. 534,389

3 Claims. (Cl. 250—40)

This invention relates to improvements in automatic tuning apparatus of the type in which a tuning instrumentality such as a variable condenser or variable inductance is operated by a motor and termination of the tuning variation is effected automatically as soon as the circuit or circuits desired to be tuned have reached resonance. Circuits of this nature are shown and described in the co-pending application of William S. Winfield, Serial No. 463,775, filed October 29, 1942.

The circuits therein described are of particular utility in connection with receivers known as stop-on-carrier or signal-seeking receivers, but are not limited to use therein, and may also be employed to advantage in transmitters and other apparatus in which it is desired to tune one or more circuits to resonance by power-driven means, and to have the tuning variation stop when the circuits are properly tuned, without requiring the attention or action of an operator.

In such circuits there is ordinarily employed a control tube operating a relay which opens and closes the motor circuit. A voltage derived from the resonance circuit may be applied to the control tube either in a manner to substantially reduce the space current of the tube and thereby operate the relay, or in a manner to provide a sudden and sharp increase in plate current to operate the relay.

In any event, this change in plate current interrupts the motor circuit when the desired resonant point is reached, and stops the supply of power to the motor. However, the motor and the gearing employed will always have a certain amount of inertia and this inertia tends to produce a certain amount of overrun in the tuning.

Customarily a clutch and brake mechanism are employed, interposed between the motor and the tuning element, so arranged that upon interruption of the motor circuit the clutch is disengaged and the brake applied to the tuning element, but even so, a certain amount of overrun may be encountered, due to failure of the relays and other mechanical arrangements to operate instantaneously when the desired current level in the resonant circuit is reached. Even the fastest relays introduce a delay of the order of a thousandth of a second, and in this time the motor may have carried the tuning instrumentality enough so the circuit is well off the resonant peak.

It is an object of this invention to correct for this amount of overrun so that when the tuning element comes to rest, the circuit will be very closely tuned to the desired resonance point.

It is another object of my invention to provide a circuit of the class described in which the tuning may be made more exact than may be achieved manually by the average operator.

It is still a further object of my invention to provide a circuit which will compensate for the inevitable overrun which may be encountered in any particular apparatus, so that it will come to rest at the same tuning point as it would if the moving parts had no inertia, and operated instantaneously.

Still other objects and advantages of my invention will be apparent from the specification.

The single figure in the drawing is a circuit diagram of one form of apparatus according to my invention.

Referring more particularly to the drawing, 1 and 2 represent terminals to be supplied with voltage from the circuit to be controlled or from a circuit in which the amplitude of the voltage varies with the tuning of the resonant circuit. If the invention is incorporated in a receiver of the superheterodyne type, terminals 1 and 2 may be supplied with voltage from the last intermediate frequency amplifier stage. This voltage I term the control voltage. The control voltage may be impressed across condenser 3 and resistor 4 and may be used to control a thermionic tube, such as tube 14, which may in this instance be a gaseous tube such as a so-called "thyratron," provided with cathode 14*c*, control grid 14*g*, and anode 14*a*.

The grid 14*g* may be connected to condenser 3, and the cathode 14*c* may be connected through switch 14*s* and a suitable source A of biasing potential to terminal 2. Switch 14*s* may be in the form of a normally closed pushbutton switch, which the operator opens for a moment when it is desired to start the tuning operation. This interrupts the plate circuit, and de-ionizes the tube, and starts the tuning motor, as will be described. Included in the anode circuit of tube 14 there may be provided relay 15 in series with the source B of plate current, and this relay 15 may comprise an actuating winding 15*w*, an armature 15*a*, and front and back contacts 15*f* and 15*b* respectively.

The circuit to be controlled may be represented by inductance 10 and variable condenser 11, and the latter may be driven by suitable electric motor 12 through an interposed clutch and brake mechanism designated by 18 and 19. Power to operate the motor 12 may be derived from any suitable source 13, which also supplies power to the winding of relay 22 for operating the clutch and brake mechanism in such a manner that when the armature 15a of control relay 15 is carried to front contact 15f, the clutch is disengaged and the brake applied.

The circuit comprising inductance 10 and condenser 11, as stated, is the circuit to be controlled, and may, in the example given, be the oscillator circuit of a superhetrodyne receiver. One side may be grounded, and the other side may be connected to the oscillator tube. Since superheterodyne circuits are well known to those skilled in the art and form, per se, no part of my invention, they are not specifically shown It will be observed that when the relay 15 has its armature 15a in back contact position, a circuit is completed from the ungrounded side of source 13 through the motor 12, through contact 15b and armature 15a to ground, and also from the same point through the winding of relay 22 to ground in the same manner. Thus, when the relay is in back contact position, motor 12 will operate and condenser 11 will rotate.

When the oscillator tuning is such as to bring in a signal of sufficient amplitude to fire the tube, the signal voltage across the cathode and grid of the tube 14 will rise until on some positive peak the tube fires. The circuit constants are so chosen that when this current reaches a predetermined level, the tube 14 fires, the space current sharply increases, and the armature 15a of relay 15 is moved to front contact 15f, interrupting the motor circuit. Thereupon the motor stops, the clutch is disengaged, the brake applied to the tuning condenser, and the formerly free end of inductance 17 is connected to ground. This establishes a circuit consisting of condenser 16 and inductance 17 in parallel with the inductance 10 and condenser 11. The significance of this will now be explained.

It will be observed that while motor 12 is in operation and the condenser 11 is rotating, condenser 16 and inductance 17 have no effect because the circuit is open at contact 15f of relay 15. In my preferred embodiment condenser 11 may be a continuously variable condenser operable over 360° so that continued operation of the motor 12 causes condenser 11 to turn repeatedly through its cycle.

Switch 20, operated by cam 21 driven in synchronism with the tuning condenser, may be provided in the plate circuit of tube 14 so that during 180° of its 360° rotation, (the return half of the condenser cycle; for example, when the capacity is going from minimum to maximum) tube 14 cannot fire. Thus, only one-half of the condenser cycle (for example, when the frequency of the resonant circuit is increasing) is effectively utilized to stop the tuning. When so arranged, any overrun of the condenser 11 would be in the direction to increase the frequency of the tuned circuit, and this may be compensated for by connecting an additional condenser 16 and inductor 17 into the circuit after the motor stops.

The value of condenser 16 and inductance 17 will naturally depend on the specific installation and the amount of overrun which is encountered, and it is a relatively simple matter to determine by measurement and calculation just how much the frequency has increased due to overrun at any point.

Condenser 16 and inductor 17 may then be chosen of the correct value to decrease the frequency by just the desired amount. If the tuning condenser 11 is a straight line capacity condenser, then inductance 17 is frequently not necessary and may be omitted, and satisfactory compensation may be achieved by the use of condenser 16 alone. However, when the condenser 11 is of the type customarily used, in which the change of capacity per degree of rotation is not uniform over the range, though the amount of angular overrun is constant, the change in frequency introduced by this overrun will be different at different settings of the condenser, and in such case it is preferable to employ the inductance 17 in addition to condenser 16.

The connection of condenser 16, and inductance 17, if the latter is used, decreases the resonant frequency of the circuit, and if the correct values are used, the compensation may be made substantially complete over the entire range, and the circuit acts, in effect, as if there were no overrun present.

The amount of compensation required in any particular instance will depend upon a number of factors, among which may be mentioned the speed of the tuning motor, the speed of the tuning instrumentality, the inertia of the moving parts, the nature of the mechanical connection between the motor and the tuning instrumentality, the sensitivity of the control tube, and the frequency range covered.

While I have shown and described certain preferred embodiments of my invention, it will be understood that modifications and changes may be made without departing from the spirit and scope of my invention, as will be apparent to those skilled in the art.

I claim:

1. In automatic tuning apparatus, in combination, a tunable circuit including an adjustable tuning instrumentality, a motor for adjusting said tuning instrumentality to tune said circuit over a predetermined frequency range, means including a control tube coupled to said tunable circuit and responsive to a predetermined amplitude of signal energy developed therein by resonance for deenergizing said motor to terminate adjustment thereby of said tuning instrumentality, means for preventing deenergization of said motor during intervals when said circuit is being tuned in one direction through its frequency range, and an auxiliary reactive circuit controlled by said first-mentioned means to be effective only upon deenergization of said motor for compensating the change of frequency of said tunable circuit caused by the inertia of said motor effecting appreciable continuing movement of said tuning instrumentality after said motor is deenergized.

2. In automatic tuning apparatus, in combination, a tunable circuit including an adjustable tuning instrumentality, a motor for adjusting said tuning instrumentality to tune said circuit over a predetermined frequency range, means including a control tube coupled to said tunable circuit and responsive to a predetermined amplitude of signal energy developed therein by resonance for deenergizing said motor to terminate adjustment thereby of said tuning instrumentality, means for preventing deenergization of said motor during intervals when said circuit is being tuned in one direction through its frequency range, and an auxiliary reactive circuit connectable under control of said first-mentioned means upon deenergization of said motor to become a part of said tunable circuit to compensate the change of frequency of said tunable circuit caused by the inertia of said motor effecting appreciable continuing movement of said tuning instrumentality after said motor is deenergized.

3. In automatic tuning apparatus, in combination, a tunable circuit including an adjustable tuning instrumentality, a motor for adjusting said tuning instrumentality to tune said circuit over a predetermined frequency range, means including a control tube coupled to said tunable circuit and responsive to a predetermined amplitude of signal energy developed therein by resonance for deenergizing said motor to terminate adjustment thereby of said tuning instrumentality, means for preventing deenergization of said motor during intervals when said circuit is being tuned in one direction through its frequency range, and a series circuit including an inductor and a condenser connectable under control of said first-mentioned means upon deenergization of said motor in shunt to said tunable circuit to compensate the change of frequency of said tunable circuit caused by the inertia of said motor effecting appreciable continuing movement of said tuning instrumentality after said motor is deenergized.

VERLIS H. WILEY.

REFERENCES CITED

The following references are of record in the file of this patent:

UNITED STATES PATENTS

| Number | Name | Date |
|---|---|---|
| 1,469,349 | Wilson | Oct. 2, 1923 |
| 2,020,275 | Beers | Nov. 5, 1935 |
| 2,056,200 | Lowell | Oct. 6, 1936 |
| 2,262,218 | Andrews | Nov. 11, 1941 |
| 2,304,871 | Andrews | Dec. 15, 1942 |
| 2,326,737 | Andrews | Aug. 17, 1943 |
| 2,363,285 | Bartholy | Nov. 21, 1944 |

FOREIGN PATENTS

| Number | Country | Date |
|---|---|---|
| 451,223 | Great Britain | July 30, 1936 |
| 214,309 | Switzerland | July 16, 1941 |